(12) United States Patent
Durfee et al.

(10) Patent No.: US 12,004,459 B2
(45) Date of Patent: Jun. 11, 2024

(54) HIGH DENSITY MOBILE PLANT CULTIVATION SYSTEM

(71) Applicants: Spacesaver Corporation, Fort Atkinson, WI (US); Fork Farms Holdings, LLC, Appleton, WI (US)

(72) Inventors: Kenneth Durfee, Janesville, WI (US); Sean Krause, Fort Atkinson, WI (US); Alexander R. Tyink, Appleton, WI (US)

(73) Assignees: Spacesaver Corporation, Fort Atkinson, WI (US); Fork Farms Holdings, LLC, Green Bay, WI (US)

( * ) Notice: Subject to any disclaimer, the term of this patent is extended or adjusted under 35 U.S.C. 154(b) by 227 days.

(21) Appl. No.: 16/681,210

(22) Filed: Nov. 12, 2019

(65) Prior Publication Data
US 2021/0137026 A1    May 13, 2021

(51) Int. Cl.
*A01G 9/24* (2006.01)
*A01G 9/02* (2018.01)
*B65G 1/10* (2006.01)

(52) U.S. Cl.
CPC ............ *A01G 9/249* (2019.05); *A01G 9/023* (2013.01); *B65G 1/10* (2013.01)

(58) Field of Classification Search
CPC ........ A01G 9/022; A01G 9/023; A01G 9/024; A01G 9/249; F21S 8/066
(Continued)

(56) References Cited

U.S. PATENT DOCUMENTS

| | | | | |
|---|---|---|---|---|
| 5,040,329 A | * | 8/1991 | Michaloski | A01G 17/02 47/65 |
| 5,265,739 A | * | 11/1993 | Price, Jr. | A47B 53/00 211/162 |

(Continued)

FOREIGN PATENT DOCUMENTS

| | | | | |
|---|---|---|---|---|
| CA | 3019052 A1 | * | 3/2020 | F21S 4/24 |
| CN | 107327788 A | * | 11/2017 | |

(Continued)

OTHER PUBLICATIONS

English-language translation of WO 2018/037188 A1 (Year: 2018).*

*Primary Examiner* — Morgan T Jordan
(74) *Attorney, Agent, or Firm* — Andrus Intellectual Property Law, LLP

(57) ABSTRACT

A plant cultivation system that includes a plurality of mobile racks and a plurality of lighting assemblies that are movable relative to each other. The mobile racks are designed to be independently movable along a floor surface and each support a plurality of planting units designed to receive the plants. The lighting assemblies are positioned adjacent to the mobile racks and are supported along an overhead lighting track independent from the mobile racks. Each of the lighting assemblies is movable along a rail of the overhead lighting track to adjust the position of the lighting assemblies relative to the mobile racks. The lighting assemblies are designed such that the mobile racks contact the lighting assemblies to move the lighting assemblies along the lighting track. Each lighting assembly includes one or more lighting fixtures that are operable to provide the required light for growing plants supported on the mobile rack.

7 Claims, 7 Drawing Sheets

(58) Field of Classification Search
USPC .................................................. 47/58.1 LS
See application file for complete search history.

(56) References Cited

U.S. PATENT DOCUMENTS

| | | | | |
|---|---|---|---|---|
| 5,439,281 | A * | 8/1995 | Croker | A47B 53/02 104/245 |
| 5,993,030 | A * | 11/1999 | Barcel | A01G 9/249 362/408 |
| 6,112,917 | A * | 9/2000 | Baker | A47B 53/02 211/162 |
| 6,161,485 | A | 12/2000 | Muth | |
| 7,177,537 | B1 * | 2/2007 | Adolphi | G03B 15/06 362/11 |
| 7,370,587 | B2 | 5/2008 | Janson et al. | |
| 7,829,838 | B2 | 11/2010 | Haubenschild et al. | |
| 9,169,069 | B2 | 10/2015 | Servant et al. | |
| 9,374,953 | B2 * | 6/2016 | Martin | A01G 27/008 |
| 9,814,186 | B2 * | 11/2017 | Anderson | A01G 31/06 |
| 10,098,287 | B2 | 10/2018 | Heidl et al. | |
| 2004/0004051 | A1 * | 1/2004 | Miyazaki | A47B 53/02 211/162 |
| 2009/0272029 | A1 * | 11/2009 | Aiking | A23B 7/015 47/1.3 |
| 2014/0144079 | A1 * | 5/2014 | Lin | A01G 9/249 47/62 R |
| 2015/0092397 | A1 * | 4/2015 | Liu | F21V 33/0012 362/127 |
| 2017/0030565 | A1 * | 2/2017 | Powell | A01G 22/00 |
| 2017/0303478 | A1 * | 10/2017 | Smith | F21V 29/58 |
| 2017/0354099 | A1 * | 12/2017 | Haughton | A01G 9/249 |
| 2019/0082606 | A1 * | 3/2019 | Moffitt | A01G 9/246 |
| 2020/0154660 | A1 * | 5/2020 | Cuello | A01G 31/06 |
| 2020/0329648 | A1 * | 10/2020 | McNamara | A01G 9/246 |

FOREIGN PATENT DOCUMENTS

| | | | | |
|---|---|---|---|---|
| NL | 8300035 | * | 8/1984 | |
| WO | WO-2010089455 A1 | * | 8/2010 | ............ A01G 9/249 |
| WO | WO-2018037188 A1 | * | 3/2018 | ............ A01G 9/249 |

* cited by examiner

HIGH DENSITY MOBILE PLANT CULTIVATION SYSTEM

BACKGROUND

The present disclosure generally relates to a heavy-duty mobile racking storage system and an adjustable lighting system that can be used in an indoor plant cultivation application. More specifically, the present disclosure relates to a plant cultivation system that allows lighting assemblies to be moveable independently of the movement of a plurality of mobile racks that support the plants.

Conventional indoor plant cultivation operations are known to use indoor or artificial lighting systems to provide ultraviolet and/or infrared radiation to plants as a method of simulating sunlight, heat and desired growing conditions. In such arrangements, lighting elements are positioned to direct light onto the plant to stimulate plant growth.

During the growth cycle of a plant, there may be a desire to adjust the amount of light reaching the plant by changing the distance between the lighting elements and the plants. Therefore, a need exists for a system in which the location of lighting elements relative to the plants being grown can be changed and modified by the user/operator.

SUMMARY

The present disclosure relates to a system for cultivating a plurality of plants. The system includes a plurality of mobile racks that each include a rack frame. The mobile racks are each configured to receive and support a planting structure that is adapted to receive the plurality of plants. The planting structure is supported on the mobile rack and is thus moveable with the movement of the mobile rack. In an exemplary embodiment of the present disclosure, each of the plurality of mobile racks are movable along a movement axis. In an exemplary embodiment, the mobile racks are supported on a floor and the floor can include floor mounted rails to guide the movement of the mobile racks.

The plant cultivating system further includes an overhead lighting track supported above the plurality of mobile racks such that the plurality of mobile racks are movable relative to the overhead lighting track. The overhead lighting track includes a plurality of rails that extend parallel to the movement axis of the mobile racks. The plant cultivating system includes at least one lighting assembly supported below the overhead lighting track and moveable along the overhead lighting track. In this manner, the lighting assemblies can move along the movement axis of the mobile racks and can move toward and away from the plants located on the mobile racks. Each lighting assembly including at least one lighting fixture that is operable to create a source of light directed at the plurality of plants.

In one embodiment of the present disclosure, the lighting assembly includes a lighting frame that is supported for movement along the overhead lighting track by a plurality of trolleys. Each of the trolleys is movable along one of the overhead rails such that the entire lighting assembly can move along the spaced rails.

The present disclosure is further directed to a method of cultivating a plurality of plants that are supported on a plurality of mobile racks, which are each supported on a floor. The method of the present disclosure includes the initial step of positioning an overhead lighting track above the plurality of mobile racks. The mobile racks are each movable under the overhead lighting track along a movement axis perpendicular to the length of each mobile rack. A lighting assembly is mounted to the overhead lighting track such that the lighting fixture extends below the overhead lighting track The method allows for the selective movement of the lighting assembly along overhead lighting track to adjust the distance between the lighting assembly and at least one of the plurality of mobile racks.

To move the lighting assemblies, a first of the plurality of mobile racks is moved into contact with the lighting assembly. The lighting assembly include a lighting frame supported for movement along the overhead lighting track by a plurality of trolleys, wherein each of the plurality of trolleys is supported for movement along one of the plurality of spaced rails. Each trolley includes a pair of bumpers that contact the mobile rack. After contact between the mobile rack and the trolleys, further movement of the first mobile rack causes the lighting assembly to move along the overhead lighting track with the first mobile rack.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
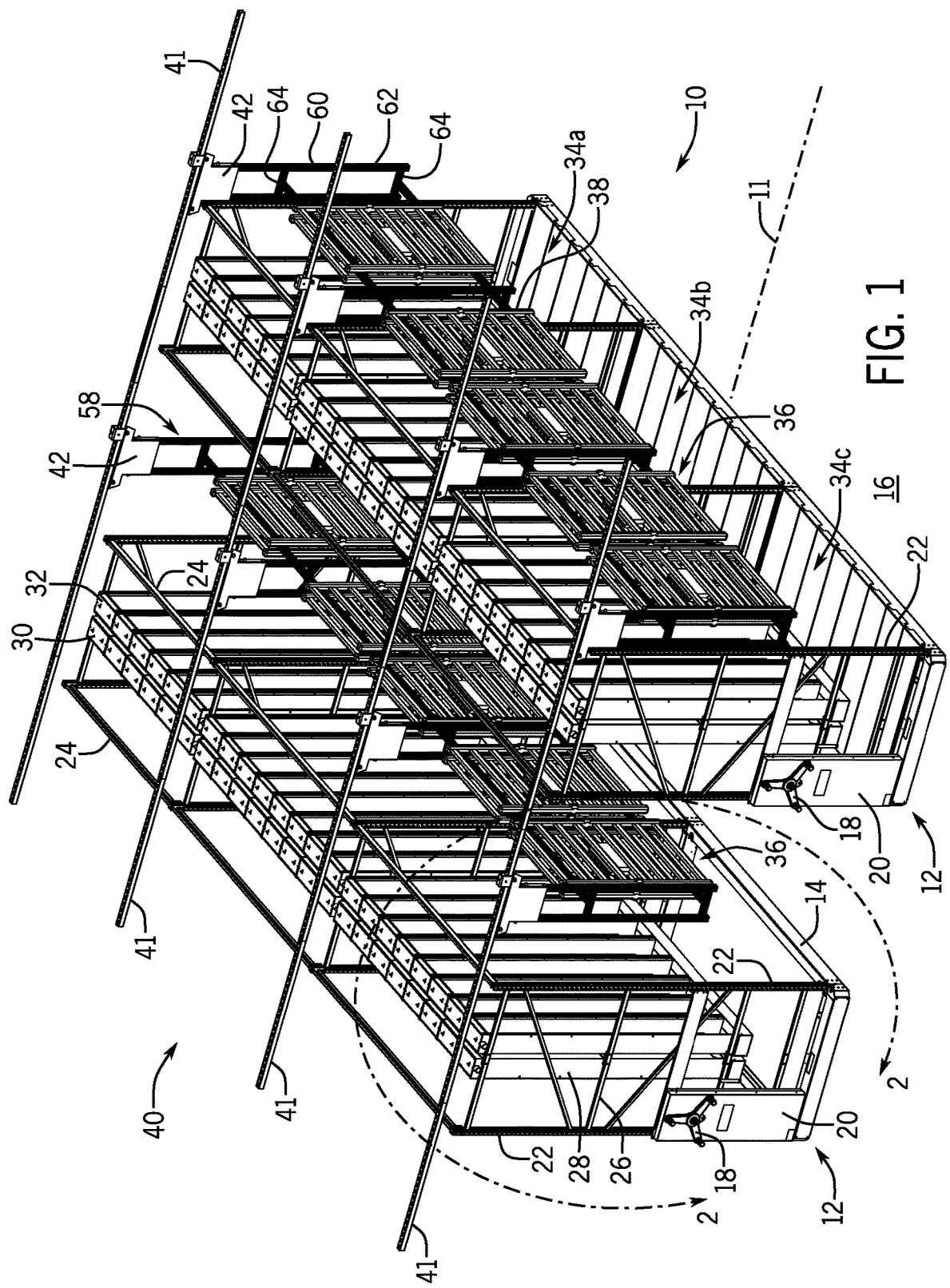
FIG. 1 is a perspective view of a plant cultivating system including a plurality of mobile racks and a plurality of lighting assemblies.

FIG. 1 illustrates a plant cultivating system 10 in accordance with the present disclosure. The plant cultivating system 10 includes a mobile racking storage system that includes a plurality of mobile racks 12 that are selectively movable relative to each other to adjust the spacing between the mobile racks 12. In the embodiment illustrated, the mobile racks 12 are supported on a floor. However, it is contemplated that the mobile racks could be supported from above and thus suspended above the floor. In the exemplary embodiment illustrated, the mobile racks 12 are each movable along a movement axis 11 which may be defined by a series of floor mounted tracks (not shown). In the embodiment shown in FIG. 1, the pair of mobile racks 12 each include a base 14 that includes a series of roller wheels that are each adapted to roll or slide within elongated tracks that are surface mounted or recessed into the floor 16. The position of each of the mobile racks 12 can be adjusted by rotating a handle 18 mounted to the front panel 20. Rotation of the handle 18 in the clockwise direction results in translating movement of the mobile rack 12 in a first direction along the movement axis 11 while rotation of the handle 18 in the opposite, counterclockwise direction results in movement of the mobile rack 12 in the opposite, second direction along the movement axis 11. The spacing between the mobile racks 12 can thus be adjusted by rotating the handle 18 on the respective mobile rack 18. Although the mobile racks 12 are shown as being manually movable, it is contemplated that the handle 18 could be replaced with a control panel and a series of electric motors such that the mobile racks 12 would be moveable through controls on the control panel.

Each of the mobile racks 12 shown in FIG. 1 includes an outer frame that is formed in part by a series of vertical uprights 22 that extend from the base 14. The vertical uprights 22 are joined at their upper ends by horizontal cross supports 24. A series of crossbars 26 extend between adjacent vertical uprights 22. The combination of the vertical uprights 22, the cross supports 24 and crossbars 26 create a stable outer support frame that can support various items, such as plants, on the mobile rack 12. As discussed above, when the handle 18 is rotated, the entire mobile rack 12 moves as a single unit along the floor supported tracks in a manner as is well known.

In the embodiment shown in FIG. 1, each of the mobile racks 12 is shown supporting multiple planting structures 28 that each include shelves or other supports for holding one or more plants being cultivated. In the embodiment of FIG. 1, the planting structures 28 are shown defining a first row 30 facing in a first direction and a second row 32 facing in an opposite, second directions. Each of the planting structures 28 are specifically designed to support a plurality of plants such that the plants can be accessed and cared for from both sides of the mobile racks 12. In the embodiment shown in FIG. 1, the mobile rack 12 is shown including three separate sections 34a, 34b and 34c that each include the planting structures 28. However, each of the mobile racks 12 could have a greater length and thus create greater or fewer numbers of growing sections 34.

As can be understood in FIG. 1, each of the mobile racks 12 is solely supported on the floor 16 by the series of rollers included within the base 14. The mobile racks 12 are designed such that each of the mobile racks 12 is independently movable along the floor.

In addition to the mobile racks 12, the plant growing system 10 of the present disclosure includes a series of lighting assemblies 36 that are designed to be movable toward and away from the mobile racks 12 to adjust the spacing between the lighting assemblies 36 and the plants supported on the planting structures 28. The distance between the lighting assemblies 36 and the plants being cultivated affects the intensity of light reaching the plants supported on each of the first and second rows 30, 32 of each mobile rack 12.

Figure 2:
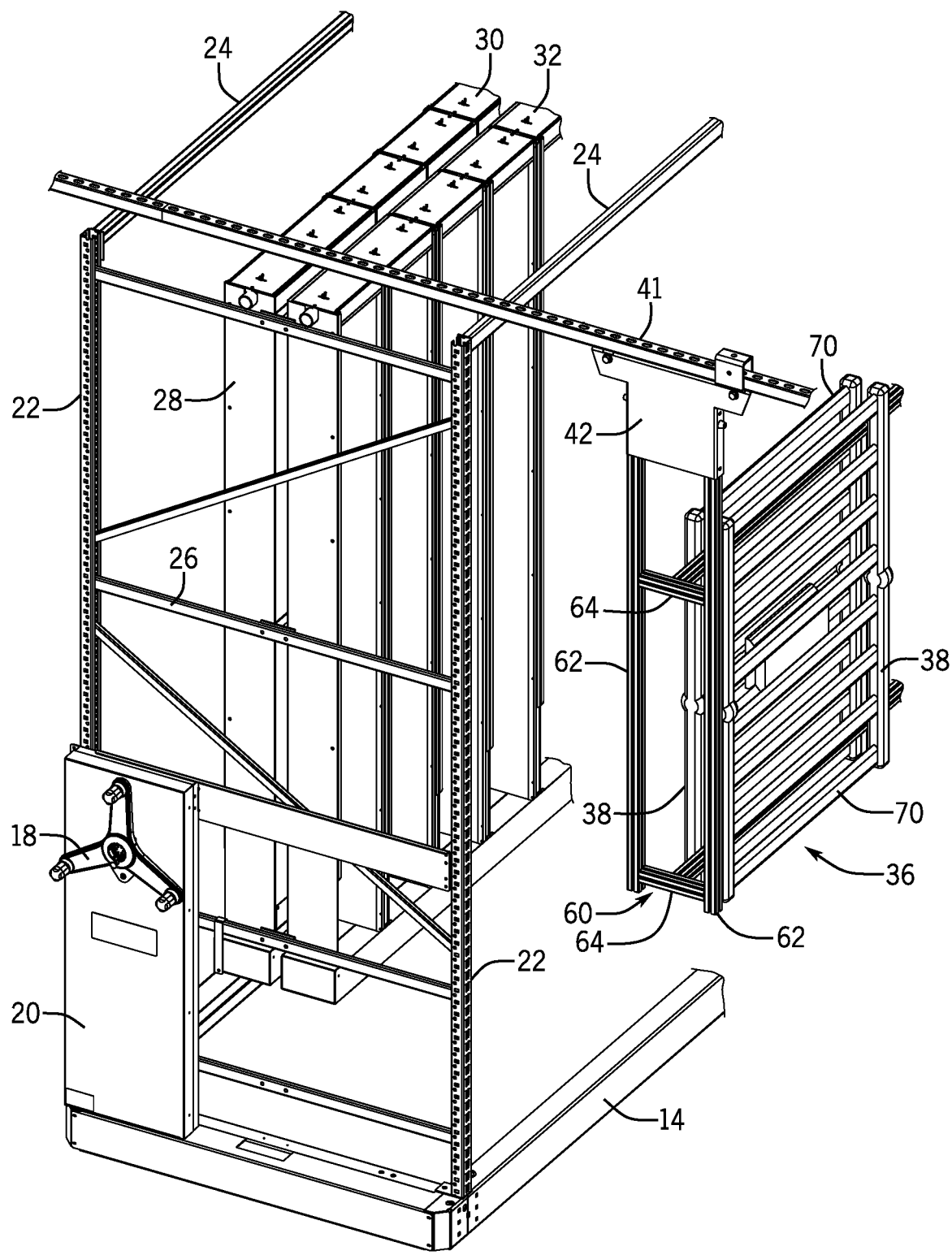
FIG. 2 is a magnified view taken along line 2-2 of FIG. 1.

As can be seen in FIG. 2, the lighting assembly 36 include a plurality of lighting fixtures 38 that are mounted to face in opposite directions. In the embodiment shown, the lighting fixtures 38 include a series of spaced LED light bars 70 or strips of LED elements that can be activated to generate the amount of light needed for the specific crop being grown. Although LED light bars 70 are shown, other types of light sources could be used in place of the LED light bars 70.

In the embodiment shown in FIG. 1, each of the lighting assemblies 36 is mounted for movement along an overhead lighting track 40 that includes a plurality of overhead mounted support rails 41. The lighting track 40 is independently mounted from the mobile racks 12 such that each of the mobile racks 12 move independently from the stationary lighting track 40. In an exemplary embodiment of the present disclosure, each of the rails 41 of the lighting track 40 extend parallel to the movement axis 11 and are suspended from the ceiling of the building in which the plant cultivation system 10 of the present disclosure is located.

As illustrated in FIG. 1, the overhead rails 41 of the lighting track 40 combine to support one or more of the lighting assemblies 36. In the embodiment shown in FIG. 1, two separate lighting assemblies 36 are illustrated. However, depending upon the number of mobile racks 12 included as part of the plant cultivation system 10, the number of lighting assemblies 36 could be greater or less than the two illustrated.

In the embodiment shown in FIGS. 1 and 2, the lighting assembly 36 positioned between the two mobile racks 12 is a two-sided lighting assembly while the light assembly 36 positioned to the right of the second mobile rack 12 could be a one-sided lighting assembly. Although not shown in FIG. 1, a third lighting assembly would be located to the left of the first mobile rack 12 to provide light onto the plants located on the left side of the mobile rack 12. Since each of the lighting assemblies 36 can support single or dual-sided lighting fixtures, the plant growing system 10 can be configured as desired by the user, which is typically dictated by the number of mobile racks 12 and the size of the building including the plant cultivating system 10.

Figure 5A:
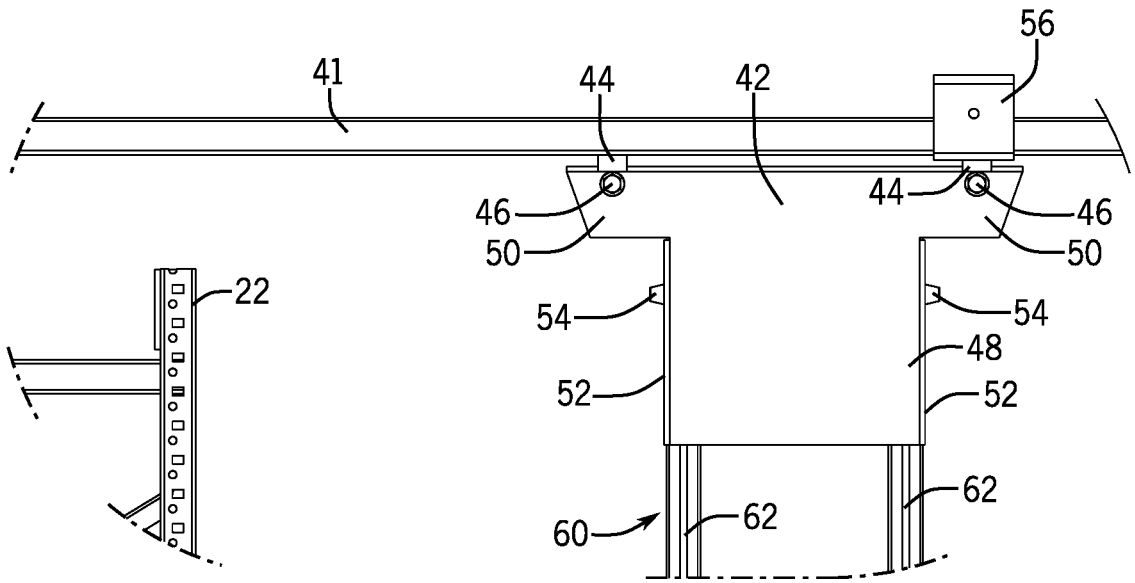
FIG. 5A is a magnified view taken along line 5A-5A of FIG. 4.
Figure 6:
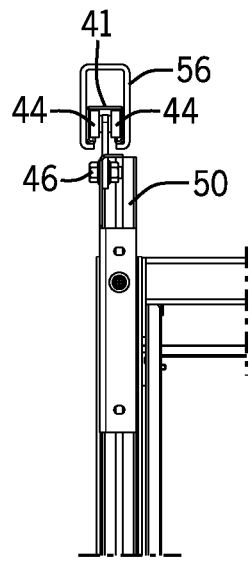
FIG. 6 is a side view of one of the trolleys.

In the embodiment shown in FIGS. 1 and 2, the lighting assembly 36 is supported for movement along the rails 41 of the lighting track by a plurality of trolleys 42. As best illustrated in FIG. 6, each of the trolleys 42 is supported along one of the rails 41 of the lighting track 40 by a pair of internal rollers 44. Each of the rollers 44 is secured within the internal passageway defined by the rail 41 and supported on the trolley 42 by a support pin 46. As can be seen in FIG. 5A, the trolley 42 has a main mounting portion 48 and a pair of extended arms 50. The extended arms 50 each extend past one of the side walls 52 to increase the overall length of the trolley 42 at the point of engagement with the lighting track 40. As can be seen in FIG. 5A, each of the side walls 52 includes a bumper 54 that protrudes from the side wall 52. In the embodiment illustrated, the bumper 54 is formed from a resilient material, such as rubber. The bumper 54 is designed to cushion the contact made between one of the vertical uprights 22 of the mobile rack 12 and the trolley 42 during movement of the lighting assembly 36 as will be described in greater detail below. The overhead lighting track further includes a series of mounting bracket 56 that can be used as a point of attachment for suspending the overhead lighting track to the ceiling or other overhead support structures.

Referring back to FIGS. 1 and 2, the plurality of trolleys 42 combine to support the entire lighting assembly 36 along the spaced rails 41 of the lighting track 40. Specifically, the trolleys 42 support a lighting frame 58 that has a length generally corresponding to the length of each of the mobile racks 12. The lighting frame 58 provides the required support for the series of lighting fixtures 38 that are included as part of each of the lighting assemblies 36. Each of the trolleys 42 is connected to and supports a vertical support frame 60 that includes a pair of frame members 62 joined to each other by a pair of cross supports 64. Each of the trolleys 42 provides support for the lighting frame 58 by supporting one of the vertical support frames 60.

Figure 3:
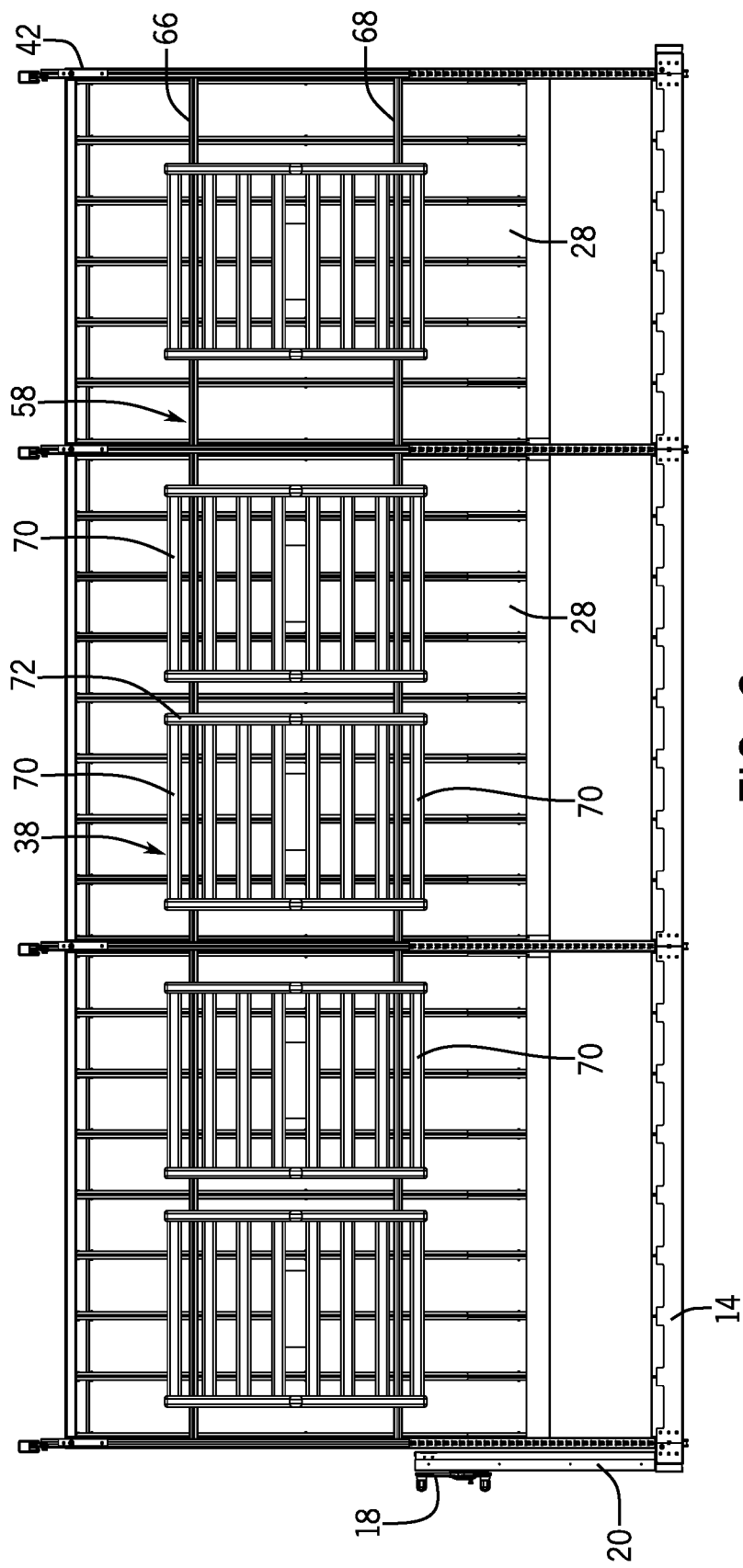
FIG. 3 is a front view of the plant cultivating system.

As can be seen in FIGS. 1 and 3, the vertical frames 60 are joined to each other by an upper crossbeam 66 and a lower crossbeam 68. The upper and lower crossbeams 66, 68 extend along the entire width of the lighting assembly 36 and are securely joined to each of the vertical frames 60 such that all of the vertical frames 60 are interconnected to each other. When the crossbeams 66 and 68 are securely attached to the plurality of vertical frames 60, the entire lighting frame 58 forms an integrated lighting frame 58 that moves in unison through the movement of the plurality of trolleys 42 supported along the overhead rails 41 of the lighting track 40.

Referring now to FIG. 3, the lighting frame 58 is designed to support a series of lighting fixtures 38 as part of the overall lighting assembly 36. In the embodiment shown in FIG. 3, the lighting fixtures 38 include a series of LED light bars 70 that extend between a pair of side supports 72. The side supports 72 are specifically designed and configure to provide a means for mounting the lighting fixture 38 to the upper crossbeam 66 and the lower crossbeam 68. In the embodiment shown in FIG. 3, each of the lighting fixtures 38 includes eight individual LED light bars 70. However, it is contemplated that greater or fewer numbers of LED light bars 70 could be utilized as part of the lighting fixture 38. In addition, it is contemplated that other types of light sources, other than LED light bars 70, could be utilized as part of the lighting fixture 38.

Figure 4:
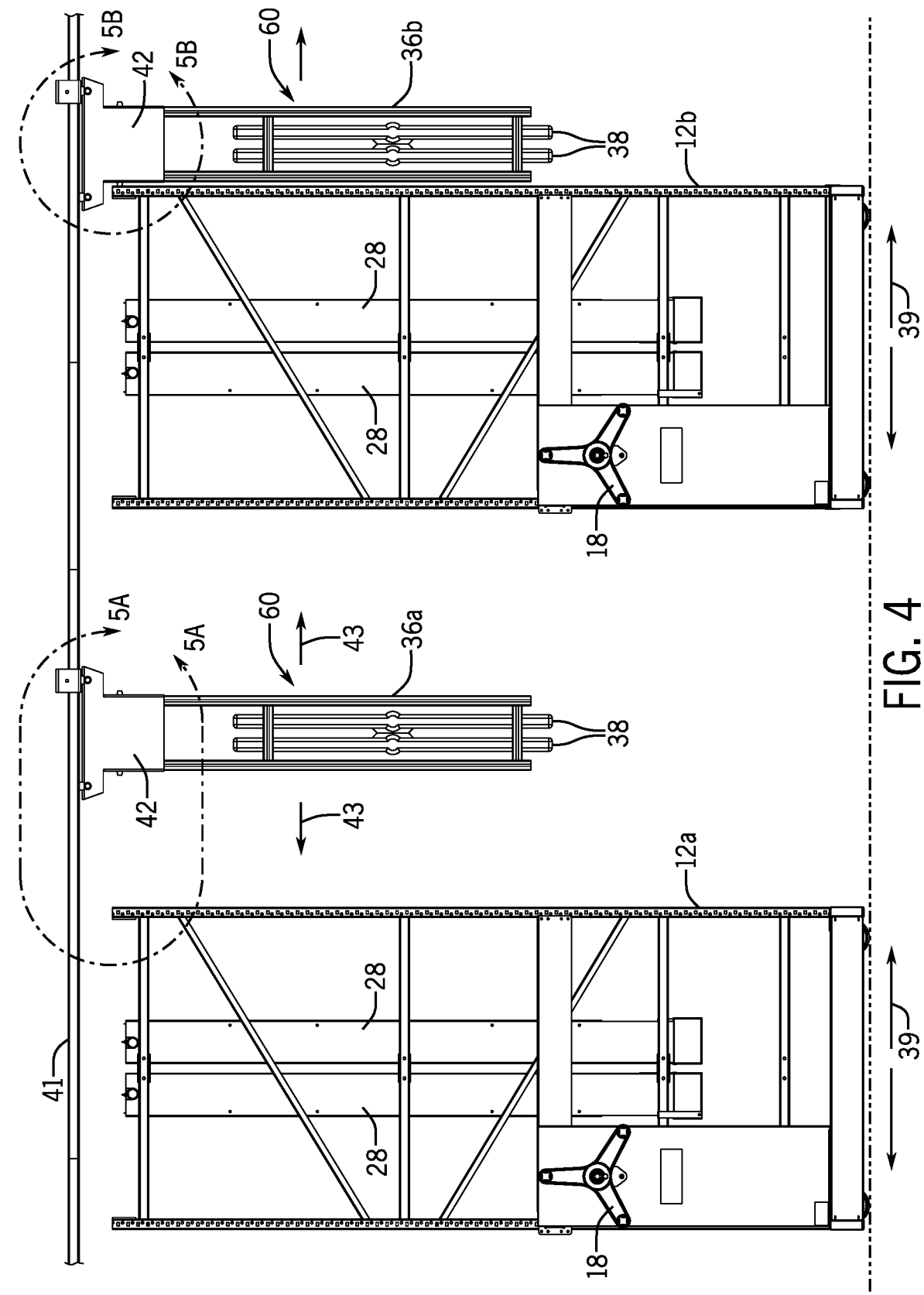
FIG. 4 is a side view of adjacent mobile racks and a pair of lighting assemblies.

FIG. 4 is a side view showing first and second mobile racks 12a and 12b positioned relative to first and second lighting assemblies 36a and 36b. Each of the first and second mobile racks 12a and 12b are movable in two opposite directions along the movement axis as illustrated by the arrows 39. Likewise, each of the first and second lighting assemblies 36a and 36b are movable in the same two directions parallel to the movement axis as is illustrated by the arrows 43. FIGS. 7A-7D discussed below detail the integrated movement of the mobile racks and the lighting assemblies.

Figure 7A:
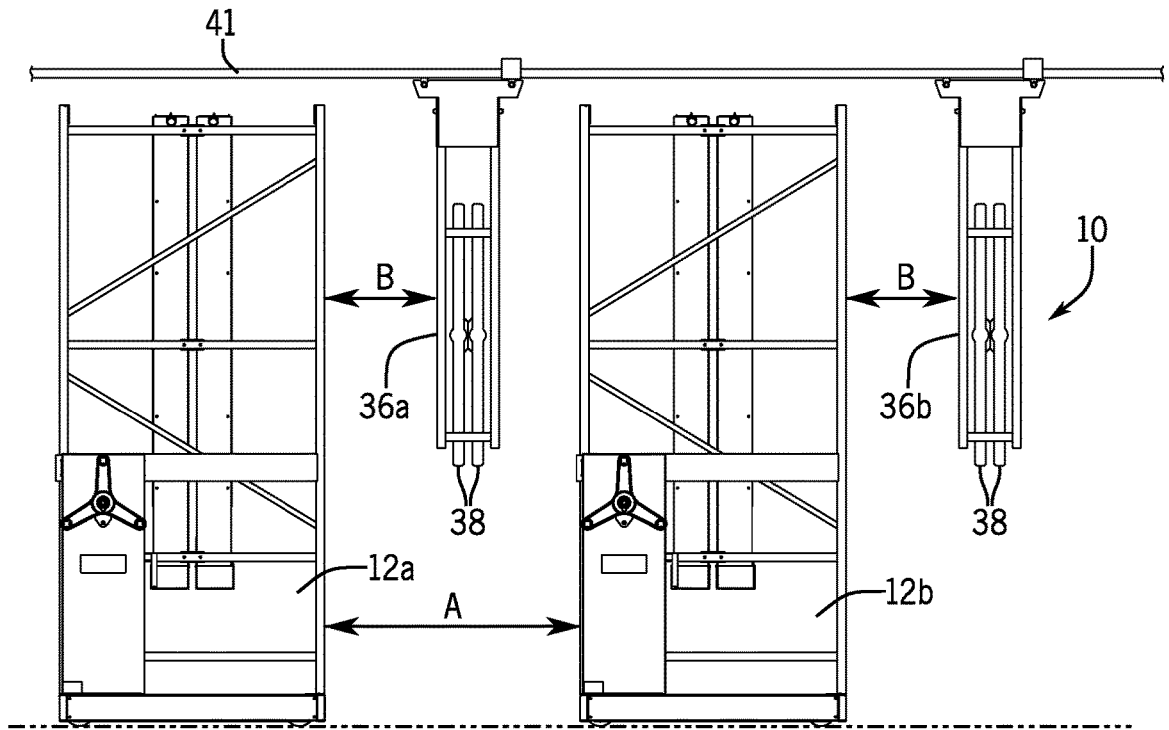
FIG. 7A is a side view illustrating a first position of the mobile racks relative to the lighting assemblies.

Referring now to FIG. 7A, thereshown is the plant growing system 10 in an initial use condition. In this condition, the mobile racks 12a and 12b are positioned at a distance A from each other. In this position, the first lighting assembly 36a is spaced a distance B from the first mobile rack 12a. Likewise, a second lighting assembly 36b is spaced the same distance B from the second mobile rack 12b. In the embodiment shown in FIG. 7A, each of the lighting assemblies 36 includes lighting fixtures 38 that are directed in forward and reverse directions.

Figure 5B:
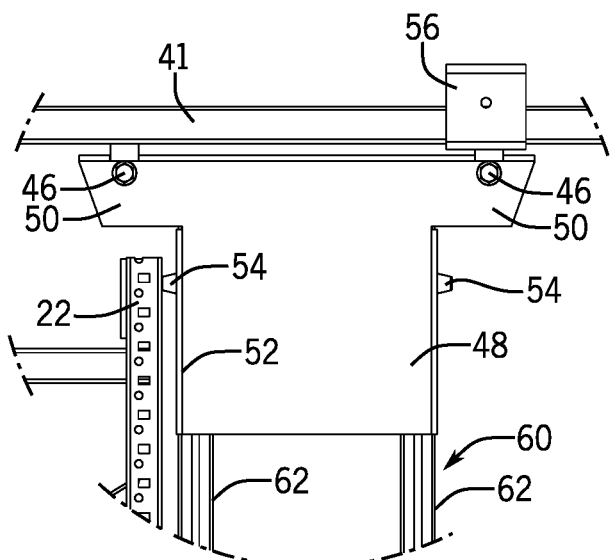
FIG. 5B is a magnified view taken along line 5B-5B of FIG. 4.
Figure 7B:
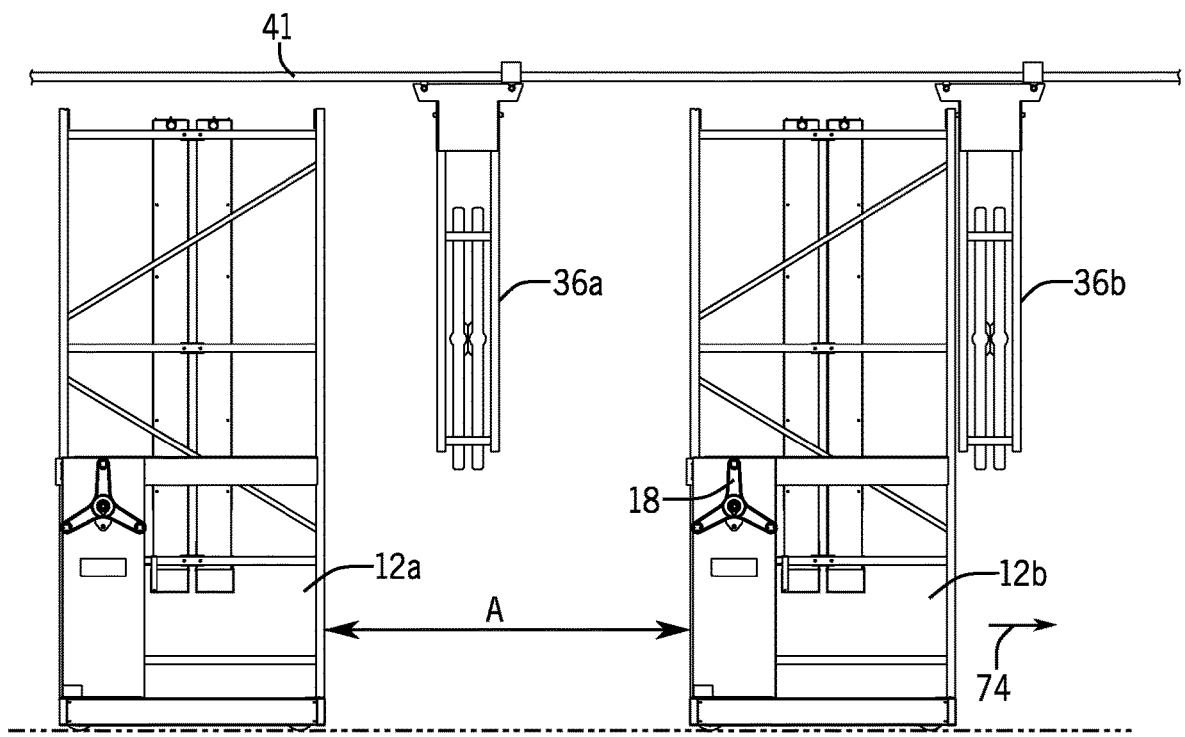
FIG. 7B illustrates the movement of one of the mobile racks into contact with one of the lighting assemblies.

If a user/operator wishes to adjust the location of the second lighting assembly 36b, the user can operate the handle 18 on the second mobile rack 12b to move the mobile rack 12b in the direction illustrated by arrow 74 in FIG. 7B. As the mobile rack 12b moves in the direction shown by arrow 74, the distance A between the first mobile rack 12a and the second mobile rack 12b increases as can be seen in the comparison between FIGS. 7A and 7B. The second mobile rack 12b continues to move in the direction shown by arrow 74 until the mobile rack 12b contacts the lighting assembly 36b. As can be seen in FIG. 5B, upon making contact, the vertical upright 22 of the mobile rack contacts the bumper 54 formed as part of the trolley 42. Since the bumper 54 is formed from a resilient material, such as rubber, the shock of the contact is absorbed by the bumper 54 to prevent damage to the trolley 42 and the associated lighting assembly.

Figure 7C:
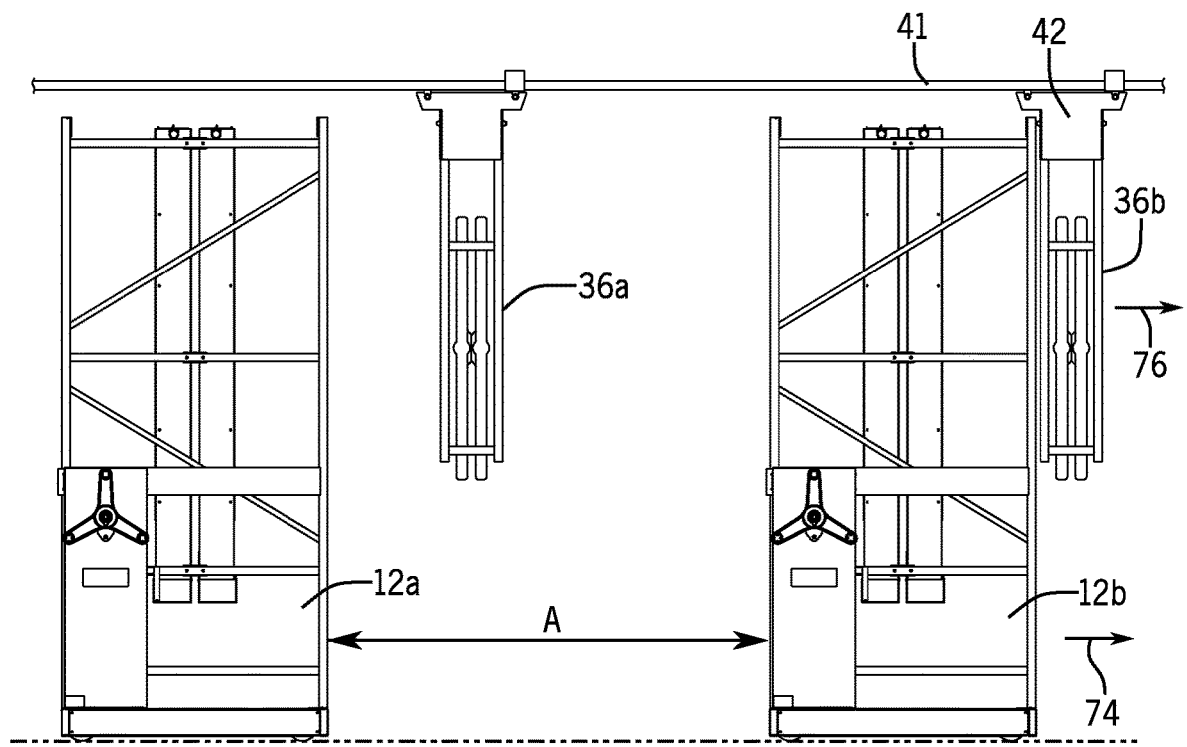
FIG. 7C illustrates the integrated movement of the mobile rack and lighting assembly.

As can be seen in FIG. 7C, additional movement of the second mobile rack 12b through operation of the handle 18 causes additional movement of the mobile rack 12b in the direction again illustrated by arrow 74. However, since the mobile rack 12b is now in contact with the lighting assembly 36b, further movement of the mobile rack 12b causes the lighting assembly 36b to move in the direction illustrated by arrow 76. Since the mobile rack 12b contacts the lighting assembly 36b at each of the trolleys 42 spaced along the width of the lighting assembly 36, the movement of the mobile rack 12b moves each of the trolleys 42 in unison. The trolleys 42 move along the rails 41 of the overhead lighting track 40 until the user has moved the lighting assembly 36b to a desired position. As can be understood in FIG. 7C, the distance A between the mobile racks 12a and 12b is increased during the movement of the mobile rack 12b.

Figure 7D:
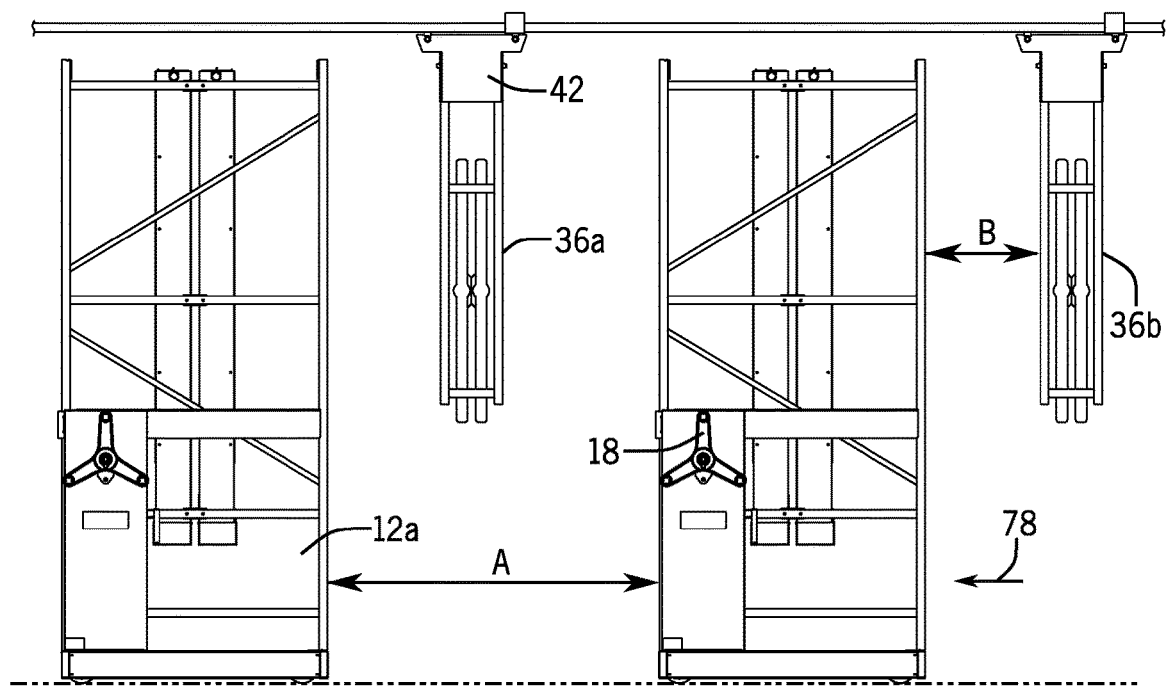
FIG. 7D illustrates the movement of one of mobile racks to create a desired distance between the mobile rack and the lighting assembly.

Once the lighting assembly 36b is in a desired position as shown in FIG. 7D, the handle 18 on the mobile rack 12b can be rotated in the opposite direction to cause the mobile rack 12b to move in the reverse direction shown by arrow 78. During this reverse movement, the distance A between the two mobile racks 12a and 12b is decreased while the distance B between the second mobile rack 12b and the second lighting assembly 36b is increased. The mobile rack 12b can be moved to a desired position that is dictated by a desired distance B between the plants contained on the mobile rack 12b and the second lighting assembly 36b. It is contemplated that the relative positions of the mobile rack 12b and the lighting assembly 36b could remain the same during the entire grow cycle or portions of the grow cycle, which may be days or weeks. Once in the desired position, the handle 18 can be locked into position using a locking pin to prevent further movement of the mobile rack 12b from the desired position. The locking pin would be released when the spacing needs to be adjusted again using the sequence described above.

As can be understood in the sequence of illustrations shown in FIGS. 7A-7D, each of the lighting assemblies 36 is designed to be moved through contact with the mobile rack 12 and subsequent movement of the mobile rack 12 after the mobile rack engages the lighting assembly 36. The series of trolleys 42 are each freely movable along the overhead rails 41 of the lighting track 40 such that the position of the lighting assemblies 36 can be adjusted through movement of the mobile racks 12.

Although the movement of the mobile racks 12 is described as being the preferred method of moving the individual lighting assemblies 36, each of the lighting assemblies 36 could be manually moved by one or more individuals pushing the lighting assemblies 36 in the desired direction. However, since each of the lighting assemblies 36 can have a width of over twenty feet, it is contemplated that moving a large lighting assembly 36 would require more than one person and that each of the plurality of persons would need to be spaced along the length of the lighting assembly. The plurality of persons would be required to push in unison to prevent skewing of the frame of the lighting assembly 36.

In the embodiment of the disclosure shown in the drawing figures, each of the mobile racks 12 includes a handoperated handle 18 to move the respective mobile rack 12. However, it is contemplated that other types of mobile racks, such as presently available from Spacesaver Corporation of Fort Atkinson, Wisconsin, could be utilized that would include an electronic actuating mechanism, such as internal electric motors and an electronic control panel, to control the movement of the individual mobile racks 12. In addition, each of the mobile racks 12 could either be movable along floor mounted guide rails or could be freely movable along a floor that is devoid of such floor mounted guide rails and instead utilized other guide structures.

In the illustrated embodiment of the present disclosure, each of the lighting assemblies 36 includes a pair of lighting fixtures 38 that direct light in opposite directions from the lighting frame. However, it is contemplated that different types of lighting fixtures could be utilized that would direct light in both directions. Additionally, it is contemplated that other types of light sources, other than LED lights, could be utilized. The individual lighting elements would be controlled from an external controller to vary the duration and intensity of the light reaching the plants being grown.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system for cultivating a plurality of plants, the system comprising:
    a plurality of mobile racks each supported on a floor and independently movable relative to each other along the floor, each of the mobile racks being configured to receive and support a planting structure adapted to receive a plurality of plants, wherein each of the plurality of mobile racks includes a rack frame and is movable only along a single movement axis, such that the plurality of mobile racks are only movable toward and away from each other along the single movement axis;
    an overhead lighting track supported above the plurality of mobile racks such that the plurality of mobile racks are movable beneath the overhead lighting track; and
    a lighting assembly supported by and extending below the overhead lighting track and moveable along the overhead lighting track, wherein the lighting assembly is located between a pair of the mobile racks and is movable along the overhead lighting track only along the single movement axis, wherein movement of the lighting assembly along the single movement axis is independent of the movement of the mobile racks along the floor, the lighting assembly including a lighting frame supported for movement along the overhead lighting track by a plurality of trolleys that are each movable along the overhead lighting track, each trolley including at least one bumper that extends laterally outward past the lighting frame, wherein the lighting frame supports at least one lighting fixture operable to create a source of light directed at the plurality of plants,
    wherein each of the mobile racks is movable along the floor such that an upper end of the mobile rack contacts only the bumpers on the plurality of trolleys of the lighting assembly to move the lighting assembly along the overhead lighting track and along the single movement axis along with the movement of the mobile racks along the single movement axis to adjust the position of the lighting assembly relative to at least one of the mobile racks.

2. The system of claim 1 wherein the overhead lighting track includes a plurality of spaced rails that each extend parallel to the single movement axis of the plurality of mobile racks.

3. The system of claim 1 wherein each of the bumpers is formed from a resilient material.

4. A method of cultivating a plurality of plants supported on a plurality of mobile racks that are each supported on a floor and are movable toward and away from each other only along a single movement axis, the method comprising:
    positioning an overhead lighting track above upper ends of the plurality of mobile racks, wherein the plurality of mobile racks only move along the single movement axis relative to the overhead lighting track;
    mounting a lighting assembly having a lighting frame to the overhead lighting track utilizing a plurality of trolleys that each are movable along the overhead lighting track and each include at least one bumper such that the lighting assembly is positioned between a pair of the mobile racks and is supported by the plurality of trolleys and extends below the overhead lighting track;
    moving a first of the plurality of mobile racks along the single movement axis and into contact with the only the bumpers of the plurality of trolleys of the lighting assembly; and
    further moving the first of the plurality of mobile racks along the single movement axis such that the trolleys of the lighting assembly move along the overhead lighting track and along the single movement axis with the movement of the first of the plurality of mobile racks to adjust a distance between the lighting assembly and at least one of the plurality of mobile racks.

5. The method of claim 4 wherein the overhead lighting track includes a plurality of spaced rails that each extend parallel to the single movement axis of the plurality of mobile racks.

6. The method of claim 5 wherein each of the plurality of trolleys is supported for movement along one of the plurality of spaced rails.

7. The method of claim 6 wherein each of bumpers contacts the upper end of a first mobile rack of the plurality of mobile racks upon movement of the first mobile rack of the plurality of mobile racks into contact with the lighting assembly.

\* \* \* \* \*